US011881113B2

(12) United States Patent
Zysk, Jr. et al.

(10) Patent No.: US 11,881,113 B2
(45) Date of Patent: Jan. 23, 2024

(54) PREDICTIVE VEHICLE ACQUISITION

(71) Applicant: Ford Global Technologies, LLC, Dearborn, MI (US)

(72) Inventors: Arthur Erik Zysk, Jr., Ann Arbor, MI (US); Mark Allan Lippman, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 676 days.

(21) Appl. No.: 16/495,225

(22) PCT Filed: Mar. 20, 2017

(86) PCT No.: PCT/US2017/023139
§ 371 (c)(1),
(2) Date: Sep. 18, 2019

(87) PCT Pub. No.: WO2018/174840
PCT Pub. Date: Sep. 27, 2018

(65) Prior Publication Data
US 2020/0033882 A1 Jan. 30, 2020

(51) Int. Cl.
*H04W 4/024* (2018.01)
*H04W 4/029* (2018.01)
(Continued)

(52) U.S. Cl.
CPC .......... *G08G 1/202* (2013.01); *G01C 21/362* (2013.01); *G05D 1/0276* (2013.01); *G06Q 10/06311* (2013.01); *H04W 4/024* (2018.02); *H04W 4/029* (2018.02); *H04W 4/12* (2013.01); *G01S 1/02* (2013.01)

(58) Field of Classification Search
CPC ........ G01C 21/00; G01C 21/10; G01C 21/12; G01C 21/16; G01C 21/26; G01C 21/34; G01C 21/36; G01C 21/3605; G01C 21/362; G01S 1/00; G01S 1/02; G05D 1/00; G05D 1/02; G05D 1/021; G05D 1/0276; G06Q 10/00; G06Q 10/06; G06Q 10/063; G06Q 10/0631; G06Q 10/06311; G06Q 50/00; G06Q 50/30; G08G 1/00; G08G 1/20;
(Continued)

(56) References Cited

U.S. PATENT DOCUMENTS 9,204,251 B1 12/2015 Mendelson
2007/0174467 A1* 7/2007 Ballou, Jr. .......... H04L 63/0838
709/227
(Continued)

FOREIGN PATENT DOCUMENTS

CN 103632534 A 3/2014

OTHER PUBLICATIONS

Notification of Transmittal of International Search Report and Written Opinion dated Jun. 8, 2017 regarding International Application No. PCT/US2017/0231139 ( 13 pages).
(Continued)

*Primary Examiner* — Charles J Han
(74) *Attorney, Agent, or Firm* — Brandon Hicks; Bejin Bieneman PLC (57) ABSTRACT

A computer is programmed to instruct a vehicle to navigate to a pickup location based on a current user location received from a first device and data about a user event received from a second device.

20 Claims, 2 Drawing Sheets (51) Int. Cl.
   *G06Q 10/0631* (2023.01)
   *H04W 4/12* (2009.01)
   *G01S 1/02* (2010.01)
   *G08G 1/00* (2006.01)
   *G01C 21/36* (2006.01)
   *G05D 1/02* (2020.01)

(58) Field of Classification Search
   CPC .......... G08G 1/202; H04W 4/00; H04W 4/02; H04W 4/024; H04W 4/029
   See application file for complete search history.

(56) References Cited

U.S. PATENT DOCUMENTS

| | | |
|---|---|---|
| 2013/0324154 A1* | 12/2013 | Raghupathy ............ G01S 19/42 455/456.1 |
| 2015/0046080 A1 | 2/2015 | Wesselius et al. |
| 2015/0081362 A1 | 3/2015 | Chadwick et al. |
| 2015/0346727 A1 | 12/2015 | Ramanujam |
| 2015/0348049 A1 | 12/2015 | Todasco et al. |
| 2015/0377635 A1* | 12/2015 | Beaurepaire ....... G01C 21/3423 701/408 |
| 2016/0165002 A1 | 6/2016 | LeBeau et al. |
| 2016/0316315 A1 | 10/2016 | Woo |
| 2016/0370194 A1* | 12/2016 | Colijn ................ G01C 21/3438 |

OTHER PUBLICATIONS

Notification of First Office Action as issued by the Chinese Patent Office dated Dec. 16, 2022 (in Chinese and English).

\* cited by examiner

PREDICTIVE VEHICLE ACQUISITION

BACKGROUND

Ride services may be provided by a driver operated vehicle and/or by an autonomous vehicle capable of receiving ride request information and navigating to various locations to provide the ride service. Current mechanisms for a user to request for such service that require user input can be cumbersome and inefficient. For example, a requirement that a user provide input via a phone, computer, and/or other electronic communication device, to request to a ride service can be constrained by the technological limitations of a user device, including a user's ability to access the device, the device's ability to provide an app or the like to receive user input, etc.

DETAILED DESCRIPTION

Introduction

Disclosed herein is a method comprising actuating a vehicle to navigate to a pickup location based on current location data received from a first device and data about a user event received from a second device.

The current location data may be based on information received by the first device from a beacon. The data about the user event received from the second device may indicate a transaction. The current location data may indicate a location proximate a building exit after the data indicating the transaction has been received. The data about the user event received from the second device may indicate a transaction location that corresponds to the current location data. The data about the user event received from the second device may include a user communication in the form of a text message. The data about the user event received from the second device may include a message from a smart appliance. The data about the user event received from the second device may include one or more of data indicating a transaction, a user communication, audio data, accelerometer data, a message from a smart appliance, and user habit data.

The method may further include instructing the vehicle to navigate to the pickup location based on data indicating a user gait characteristic.

The method may further include identifying that a pickup at the pickup location has been performed after a previous actuation of the smart appliance.

Also disclosed herein is a computer programmed to perform the above method.

Also disclosed herein is a computer readable medium storing program instructions executable by a computer processor to perform the above method.

Also disclosed herein is a system comprising, a computer programmed to instruct a vehicle to navigate to a pickup location based on a current user location received from a first device and data about a user event received from a second device.

The current location may be based on information received by the first device from a beacon. The data about the user event received from the second device may indicate a transaction. The current location may indicate a location proximate a building exit after the data about the user event indicating the transaction has been received. The data about the user event received from the second device may indicate a transaction location that corresponds to the current location data. The data about the user event received from the second device may include user communication in the form of a text message. The data about the user event received from the second device may include a message from a smart appliance. The data about the user event received from the second device may include one or more of data indicating a transaction, a user communication, audio data, accelerometer data, a message from a smart appliance, and user habit data.

The computer may be further programmed to instruct the vehicle to navigate to the pickup location based on data indicating a user gait characteristic.

The computer may be further programmed to identify that a pickup at the pickup location has been performed after a previous actuation of the smart appliance.

Figure 1:
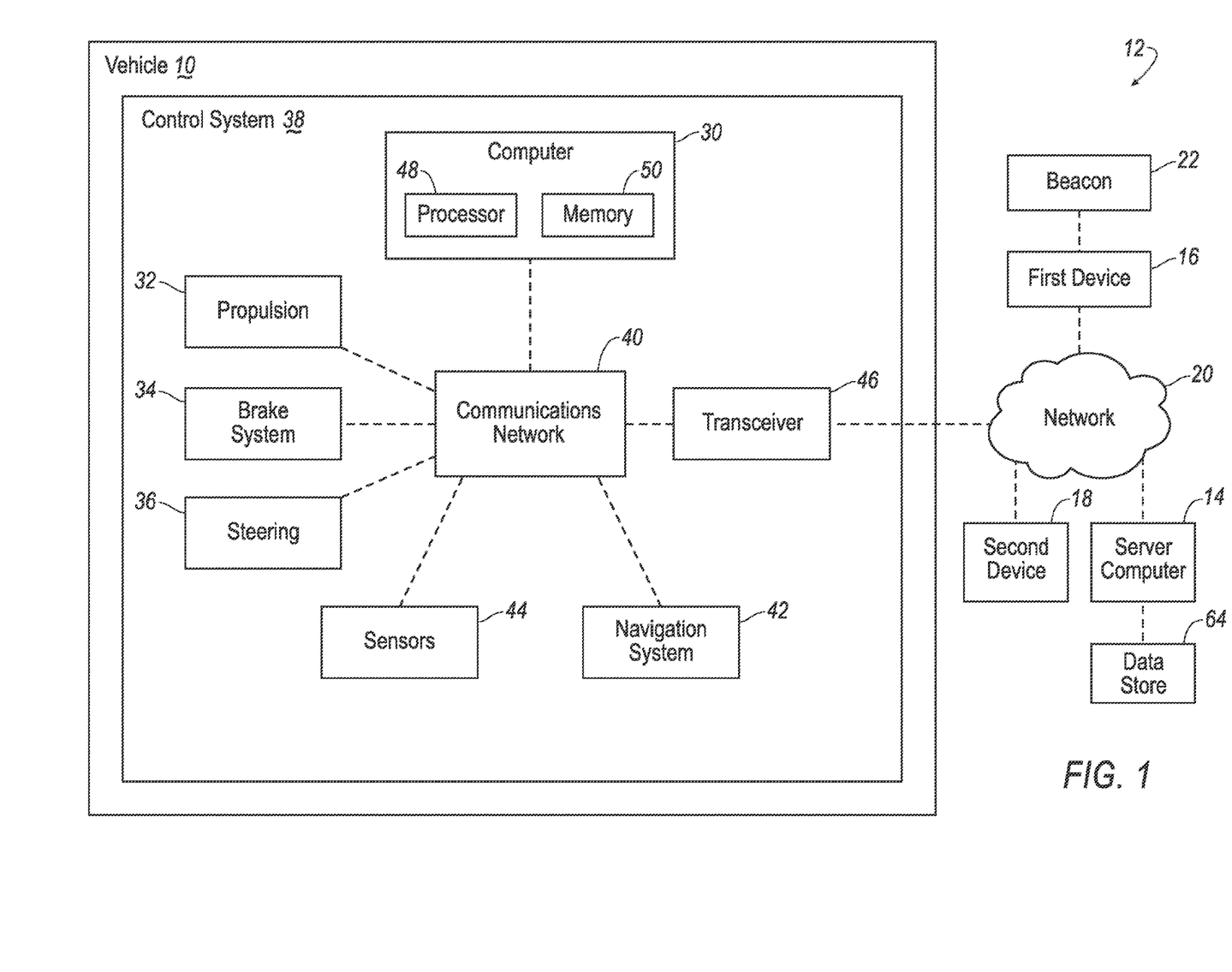
FIG. 1 is a block diagram of an example system for actuating a vehicle to a pickup location.

With reference to the FIG. 1, a solution to providing a vehicle 10 to perform a ride service with minimal manual input from a user includes a system 12 having a server computer 14 programmed to instruct or request the vehicle 10 to navigate to a pickup location based on a current user location received from a first device 16 and data about a user event received from a second device 18 via a network 20. The current user location may be determined at least in part based on information received by the first device 16 from a beacon 22. As used herein, a user "event" is acquired data that meets one or more predefined parameters. For example, an event could be a time of day, input to a transaction processing device, input to a home appliance, etc., and/or a combination of the foregoing and/or other data.

The Vehicle

The vehicle 10 may include any traditional, semi-autonomous, or autonomous passenger or commercial automobile such as a sedan, a station wagon, a sport utility vehicle, a crossover vehicle, a van, a minivan, a taxi, a bus, etc. A computer 30, sometimes referred to as the vehicle 10 controller 30, may be capable of operating the vehicle 10 independently of the intervention of a human driver, completely or to a greater or a lesser degree. The computer 30 may be programmed to operate a propulsion 32, a brake system 34, a steering 36, and/or other vehicle systems.

For purposes of this disclosure, an autonomous mode is defined as one in which each of the propulsion 32, the brake system 34, and the steering 36 of the vehicle 10 are controlled by one or more computers 30; in a semi-autonomous mode computer(s) 30 of the vehicle 10 control(s) one or two of vehicle the propulsion 32, the brake system 34, and the steering 36.

As seen in FIG. 1, a block diagram illustrates elements in the vehicle 10 including a communication network 40 that provides communication between the propulsion 32, the brake system 34, the steering 36, a navigation system 42, sensors 44, a transceiver 46, and the computer 30.

The vehicle 10 communication network 40 includes hardware, such as a communication bus, for facilitating communication among vehicle 10 components. The communication network 40 may facilitate wired or wireless communication among the vehicle components in accordance with one or more communication protocols such as controller area network (CAN), Ethernet, WiFi, Local Interconnect Network (LIN), and/or other wired or wireless mechanisms.

The propulsion 32 of the vehicle 10 generates energy and translates the energy into motion of the vehicle. The propulsion 32 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 32 is in communication with and receives input from the computer 30 and/or from a human driver. The human driver may control the propulsion via, e.g., an accelerator pedal and/or a gear-shift lever.

The brake system 34 resists the motion of the vehicle 10 to thereby slow and/or stop the vehicle 10, e.g., known vehicle braking subsystems. The brake system 34 may be friction brakes such as disc brakes, drum brakes, band brakes, etc.; regenerative brakes; any other suitable type of brakes; or a combination. The brake system 34 can include an electronic control unit (ECU) or the like that actuates the brake system 34 to resist the motion of the vehicle 10, e.g., in response to a command from the computer 30 and/or from a human driver. The human driver may control the brake system 34 via, e.g., a brake pedal.

The steering 36 is typically a known vehicle steering subsystem and controls the turning of the wheels. The steering 36 is in communication with and receives input from a steering wheel and/or the computer 30. The steering 36 may be a rack-and-pinion system with electric power-assisted steering, a steer-by-wire system, as are both known in the art, or any other suitable system.

The vehicle 10 further typically includes sensors 44. The sensors 44 may detect internal states of the vehicle 10, for example, wheel speed, wheel orientation, and engine and transmission variables. The sensors 44 may detect the position or orientation of the vehicle 10, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 44 may detect the external world, for example, radar sensors, scanning laser range finders, light detection and ranging (LIDAR) devices, and image processing sensors such as cameras. The sensors 44 may include communications devices, for example, vehicle-to-infrastructure (V2I) or vehicle-to-vehicle (V2V) devices.

The transceiver 46 transmits and receives information wirelessly from other transceivers, either directly or via the network 20, enabling signals, data and other information to be exchanged with other computer and network systems, e.g., the server computer 14. The transceiver 46 is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers.

The computer 30 is a computing device that includes a processor 48 and a memory 50. The computer 30 is in electronic communication with, e.g., via the communications network 20, one or more input devices for providing data to the computer 30 and one or more output devices for receiving data and/or instructions from the computer 30, e.g., to actuate the output device. Example input devices include: the sensors 44, the transceiver 46, the navigation system 42, etc., as well as other sensors and/or electronic control units (ECUs) that provide data to the computer 30. Example output devices that may be actuated by the computer 30 include: the propulsion 32, the brake system 34, the steering 36, the transceiver 46, the navigation system 42, etc.

The processor 48 is implemented via circuits, chips, or other electronic components and may include one or more microcontrollers, one or more field programmable gate arrays (FPGAs), one or more application specific circuits (ASICs), one or more digital signal processors (DSPs), one or more custom integrated circuits, etc. The processor 48 is programmable to process the data received via the sensors 44, the transceiver 46, the memory 50, etc., as well as other sensors and/or electronic control units (ECUs) that provide data to the computer 30, e.g., on the communications network 20. Processing the data and communications may include processing to navigate the vehicle 10 to a location, e.g., the pickup location, in response to receiving a message from the server computer 14, e.g., via the network. The processor may further be programmed for performing the processes described herein.

The memory 50 is implemented via circuits, chips or other electronic components and can include one or more of read only memory (ROM), random access memory (RAM), flash memory, electrically programmable memory (EPROM), electrically programmable and erasable memory (EEPROM), an embedded MultiMediaCard (eMMC), a hard drive, any volatile or non-volatile media, etc. The memory 50 may store programming instructions for performing the processes described herein, and data collected from sensors and communications.

Wide-Area Network

A network 20 (sometimes referred to as a wide area network because it can include communications between devices that are geographically remote, i.e., not in a same building, vehicle, etc., from one another) represents one or more mechanisms by which the server computer 14 may communicate with remote devices, e.g., the vehicle 10, the first and second devices 16, 18, e.g., a user device, smart appliances, point of sale systems, wearable devices, etc., and/or other computing devices. Accordingly, the network 20 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services. Although the first the second devices 16 18 shown in the drawing as communicating with the server computer 14 independently, e.g., the first device 16 communicates with the server computer 14 via the network 20 and the second device 18 communicates with the server computer 14 via the network 20, it may also be the case that the first the second devices 16 18 communicated with the server computer 14 cooperativity. For example, the second device 18, e.g., the wearable device may access the network 20 via the first device 16, e.g., the user device.

Devices

The first device 16 and second device 18 are computing devices in communication with the server computer 14. The first device 16 is a user device. The second device 18 may be a user device, a smart appliance, a smart speaker, a wearable device, etc.

User devices may be any one of a variety of computing devices implemented via circuits, chips, antenna, or other electronic components, and is typically a portable or wearable user device, e.g., a smartphone, a tablet, a personal digital assistant, etc. The user device may include sensors, e.g., an accelerometer, GPS sensors, etc. The user device may be programmed to determine its location, e.g., based on information received from the GPS sensors, a message received from the beacon 22, e.g., via the antenna. The user device may communicate with the vehicle computer 30, the server computer 14, a wearable device, etc., e.g., via the network 20.

The beacon 22 is implemented via circuits, chips, antenna, or other electronic components to transmit information. Example beacons 22 include low energy Bluetooth devices. The beacon 22 transmits the information to be received by nearby, e.g., within 20 feet, computing devices, e.g., user devices. The information transmitted from the beacon 22 identifies a location of the beacon 22. For example, the information may identify a latitude and longitude of the beacon 22, a location type of the beacon 22, e.g., an exit location, a transaction location, etc. The information may include a transmission time to enable the user device to determine a distance of the user device from the beacon 22, e.g., using known time of flight algorithms. The user device may combine distances from multiple beacons 22 to determine the location of the user device, e.g., using known triangulation algorithms.

Smart appliances are traditional appliances that include a computing device having circuits, chips, antenna, or other electronic components, including those discussed herein, to process and transmit information, e.g., via the network 20. Smart appliances may include sensors such as voltage sensors, continuity sensors, pressure sensors, cameras, etc. The sensors may detect a state of the smart appliance, e.g., that the smart appliance, such as a smart toothbrush or a smart light switch, is actuated to an "on" or "off" state, something related to the smart appliance, e.g., a smart refrigerator that detects the absence of a milk carton, a smart coffee machine that detects an amount of beans, e.g., 3 ounces, contained therein, etc. Smart appliances may transmit a message, e.g., to the server computer 14 regarding the smart appliance. The message may indicate the state of the smart appliance, e.g., that the smart appliance is in the "on" state, the smart refrigerator is out of milk, etc.

The smart speaker is a computing device including a speaker, a microphone, circuits, chips, antenna, or other electronic components, including those discussed herein, to process and transmit information, e.g., via the network 20 to the server computer 14. The smart speaker may monitor audio detected with the microphone, and transmit commands, keywords, and combinations thereof based on such audio detection.

Point of sale systems are computing devices used to complete a transaction. Point of sale systems include circuits, chips, antenna or other electronic components, including those discussed herein, to process and transmit information, e.g., via the network 20 to the server computer 14.

The wearable device may be any one of a variety of computing devices including a processor and a memory, implemented as described herein, as well as communication capabilities that is configured to be worn on a user's body. The wearable device may include circuits, chips, antenna, sensors, e.g., an accelerometer, or other electronic components, including those discussed herein. For example, the wearable device may be a watch, a smart watch, a vibrating apparatus, etc. that includes capabilities for wireless communications using IEEE 802.11, Bluetooth, and/or cellular communications protocols.

Server Computer

The server computer 14 is a computing device that includes hardware, e.g. circuits, chips, antenna, etc., programmed to transmit, receive, and process information, to and from the vehicle 10, user devices, other server computers 14, smart appliances, point of sale systems, wearable devices, etc., e.g., via the network 20. The server computer 14 may be one or more computers, each generally including at least one processor and at least one memory, implemented as described herein, the memory storing instructions executable by the processor, including instructions for carrying out various steps and processes described herein. The server computer 14 may include or be communicatively coupled to a data store 64 for storing collected data.

The server computer 14 is programmed to instruct or request the vehicle 10 to navigate to the pickup location based on a current user location received from the first device 16 and data about a user event received from the second device 18.

The server computer 14 may instruct or request the vehicle 10 to navigate to the pickup location by transmitting a message to the vehicle 10, e.g., via the network 20. The pickup location is a location accessible by the vehicle 10 and a user of the vehicle 10 where the user may enter the vehicle 10. For example, the pickup location may be a parking spot outside of a building, a loading zone, a shoulder of a roadway, etc. Various pickup locations may be stored in a database in the server computer 14 and/or the data store 64. The server computer 14 may identify the vehicle 10, e.g., out of a fleet of vehicles, based on a location of the vehicle 10 relative to the pickup location, e.g., the vehicle 10 out of the fleet of vehicles located within the closest distance to the pickup location.

The first device 16, e.g., the user device, may determine its location based on GPS information and/or information received from the beacon 22, as described above. The current location determined by the user device is transmitted to server computer 14, e.g., via the network 20. The current location may be transmitted to the server computer 14 with the use of an internet protocol address, an email address, etc., associated with the server computer 14. Transmitting the current location may include transmitting identifying information associated with the user device, e.g., an email address, a unique name, etc., with the current location.

The server computer 14 may use the data from the second device 18, e.g., another user device, smart appliances, point of sale systems, wearable devices, etc., in combination with the current location from the first device 16 to trigger actuation of the vehicle 10.

The data and location may be used by the server computer 14 to trigger the pickup based on a rule, i.e., certain preconditions that when met indicate that the pickup should be performed, e.g., stored in the server computer 14 and/or data store 64. Additionally or alternatively, the data and location may be used by the server computer 14 as part of a confidence calculation, i.e., a calculation determining a confidence level indicating a probability that the pickup is needed, e.g., the higher the confidence level the more likely the user needs the pickup, used to trigger the pickup, e.g., when the confidence level is above a threshold. The rule and/or confidence calculation using the data from the second device 18 and the current location from the first device 16 may be combined with other information, e.g., a time of day, day of the week, etc., to trigger actuation of the vehicle 10.

For example, a rule may exist to instruct the vehicle 10 to navigate to the pickup location based on a certain current location and user event, e.g., when the first device 16 indicates the current location is a user's home and the second device 18 indicates the user has just brushed their teeth, e.g., via the smart toothbrush transmitting a message that it has been actuated.

For example, when performing the confidence calculation, certain current locations and combinations of current locations from the first device 16 may increase or decrease the confidence level used by the server computer 14 to determine that it should instruct the vehicle 10 to navigate to the pickup location. Similarly, certain data from the second device 18 may increase or decrease the confidence level. For example, point values associated with various locations, user events, other information (e.g., calendar information) and combinations thereof may be stored in a lookup table in the server computer 14 and/or data store 64. The server computer 14 may sum the point values associated with locations, user events, other information and combinations thereof received by the server computer 14 with a certain amount of time, e.g., 5 minutes, and/or within a certain time window, e.g. 4:00 pm to 5:00 pm, to calculate the confidence level. In such a situation, the server computer 14 may compare the calculated confidence level to a threshold level. When the confidence level is above the threshold level, the server computer 14 may instruct the vehicle 10 to navigate to the pickup location.

The data about the user event received from the second device 18 may include one or more of data indicating a transaction, a user communication, audio data, accelerometer data, a message from the smart appliance, and user habit data.

Data indicating a transaction is data that indicates a transaction has occurred. The data indicating a transaction may be transmitted to from the point of sale system. The data indicating a transaction may include an identification of a user making the transaction, e.g., based on credit card transaction data, and a location of the transaction, e.g., a physical street address, a business name associated with a certain location, etc.

The server computer 14 may be programmed to instruct the vehicle 10 to a pickup location when the current location indicates a location proximate a building exit after the data about the user event indicating the transaction has been received. For example, subsequent receiving the data from the second device 18, e.g., the point of sale system, indicating a transaction at a store within a shopping mall, the server computer 14 may receive current location data, e.g., from the first device 16 based on a beacon 22 message inciting a location proximate, e.g., within 10 yards, of a shopping mall exit. Additionally, or alternative, such actuation of the vehicle 10 may be based on a determining the current location is approaching the shopping mall exit, e.g., based on messages from multiple beacons 22. Upon receipt of such current locations and data, the server computer 14 may instruct the vehicle 10 to navigate to a pickup location, e.g., a parking lot outside of the shopping mall exit.

The user communication is a massage to and/or from the user associated with the first device 16. The user communication may be transmitted from and/or to the second device 18, e.g., another user device, and relayed to the server computer 14, e.g. via the network 20. Example user communications include voice calls, text messages, emails, etc. The user communication may be analyzed by the server computer 14 for keywords and combinations of keywords, e.g., using voice recognition and known text analysis techniques, methods, and algorithms.

The server computer 14 may be programmed to instruct the vehicle 10 to a pickup location when the data about the user event received from the second device 18 includes a user communication in the form of a text message. For example, the first device 16, e.g., the user device, may receive a text message from the second device 18, e.g. another user device. The message may also be received by the server computer 14. The message may state "meet me at the airport in one hour." The server computer 14 may identify certain keywords, e.g., "meet" "airport," and "one hour." The server computer 14 may determine that a pickup by the vehicle 10 is needed for the user to make it to the airport from the current location within the specified time. Accordingly, the server computer 14 may instruct the vehicle 10 to navigate to a pickup location at the current location.

Audio data is data indicating the content of the audio, e.g., a user conversation or command, detected by the second device 18, e.g., the smart speaker detecting the user conversation or command with the microphone of the smart speaker. The detected conversation or command may be analyzed using voice recognition and keywords, as discussed above for the user communication.

Accelerometer data indicates various accelerations detected by the second device 18, e.g., the user device, the wearable device, etc. Accelerometer data may be transmitted to the server computer 14, e.g., via the network 20, and include information identifying the second device 18 it was transmitted from and/or information associated with a user of the second device 18, e.g., a serial number, a unique name, an email address, etc. The accelerometer data may be analyzed to identify a gait characteristic of the user, e.g., using known techniques and methods. For example, the acceleration data may be used to determine a pace of the gait, e.g., 100 steps per minute, a balance of the gate, e.g., 50% swing phase and 50% support phase, etc.

The server computer 14 may be programmed to instruct the vehicle 10 to navigate to the pickup location based on the data indicating the user gait characteristic. For example, the server computer 14 may analyze the accelerometer data, e.g., from the user device, the wearable device, etc., and determine that the pace of the gait is above a threshold, e.g., 80 steps per minutes. In another example, the server computer 14 may analyze the accelerometer data and determine that the gait is off balance by at least a threshold amount, e.g., 4% more time in swing phase than support phase, such as when the user is limping or carrying a heavy object off to one side of their body. Upon such determinations the server computer 14 may instruct the vehicle 10 to navigate to a pickup location.

The message from the smart appliance may indicate the state of the smart appliance, as discussed above. The message from the smart appliance may be transmitted to the server computer 14 via the network 20.

The server computer 14 may be programmed to instruct the vehicle 10 to a pickup location based on the message from the smart appliance. For example, the server computer 14 instruct the vehicle 10 to navigate to the pickup location with a rule of confidence calculation that considers receipt of a message indicating the smart appliance has been actuated, e.g., the smart toothbrush has been turned on, and/or receipt of a message indicating the state of something related to the smart appliance, e.g., there is no milk in the smart refrigerator.

User habit data is data indicating a user pickup has occurred correlated to a user event and current location a threshold number, e.g., 3, of times. For example, the server computer 14 may store information regarding previous vehicle 10 pickup instructions, previously received current locations, and previous data indicating user events, e.g., previous messages from the smart appliance regarding its actuation. The server computer 14 may analyze such information, e.g., using known information and data techniques, to identify repeated correlations among the information, e.g., when a pickup has been performed at a pickup location after actuation of the smart appliance. Correlations may be stored in the server computer 14 and/or in the data store 64, to identity habit data. The server computer 14 may use the identified habit data to create a new pickup rule and/or to adjust how the confidence calculation is made.

The Process

Figure 2:
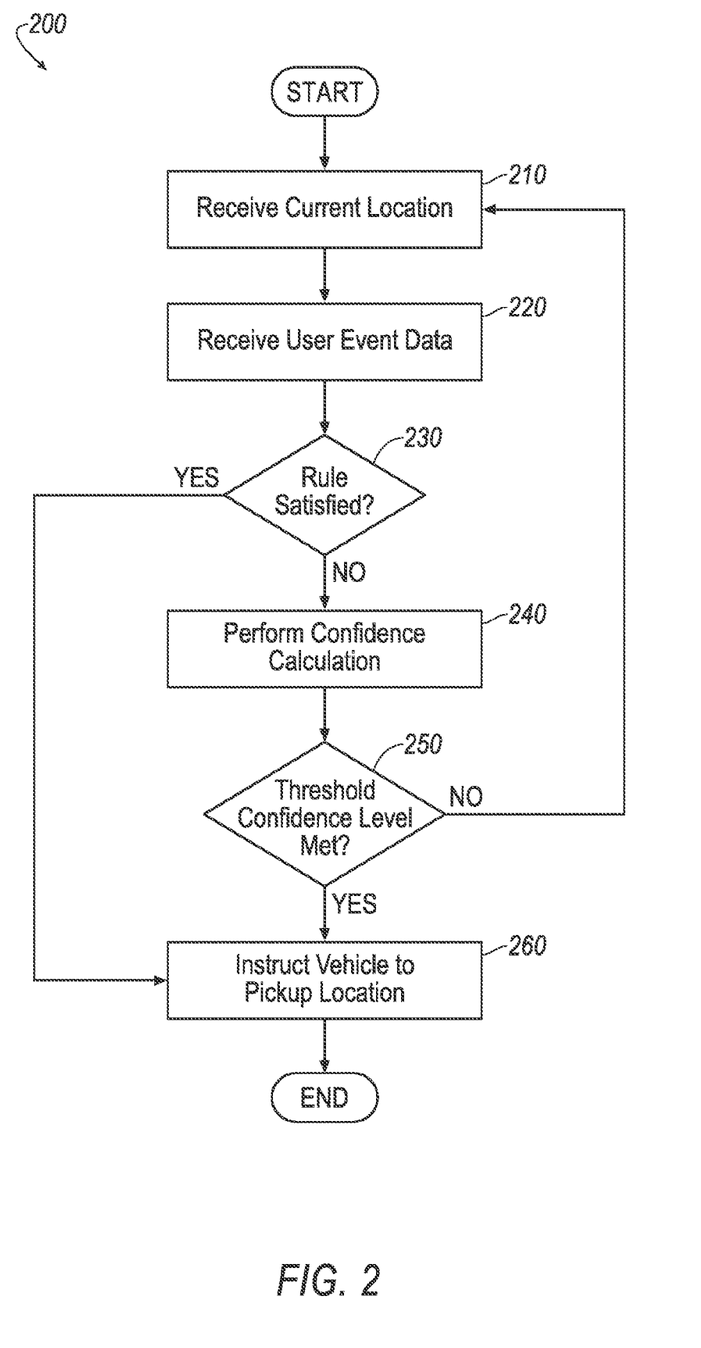
FIG. 2 is a flow chart showing an example process for instructing the vehicle of FIG. 1 to navigate to the pickup location.

FIG. 2 is a process flow diagram illustrating an exemplary process 200 for instructing a vehicle 10 to navigate to a pickup location. The process 200 begins in a block 210 by receiving a current location, e.g., the server computer 14 receives the current location from the first device 16.

At a block 220 data indicating a user event is received. For example, the server computer 14 receives the data indicating the user event from the second device 18.

Next at a block 230 a determination is made whether the received current location(s) and the data indicating the user event(s) satisfy a rule. For example, the server computer 14 determines whether the current location(s) received from the first device 16 and the data indicating the user event(s) received from the second device 18 satisfy a rule stored in the server computer 14. When a rule is not satisfied the process 200 moves to a block 240. When a rule is satisfied the process 200 moves to a block 260.

At the block 240 a confidence calculation is performed to determine a confidence level, e.g., with the server computer 14 as described above.

Next at a block 250 a determination is made whether the confidence level from the confidence calculation meets or exceeds a threshold level, e.g., the server computer 14 compares the calculated confidence level with the threshold level. When the calculated confidence level meets or exceeds the threshold confidence level the process moves to a block 260. When the calculated confidence level does not meet or exceed the threshold level the process returns to the block 210 to continue receiving current location(s), data indicating the user event(s) and determining whether such locations and data satisfy a rule or raise the confidence level above the threshold level.

At the block 260 the vehicle 10 is instructed to navigate to a pickup location, e.g., the server computer 14 transmits such instruction to the vehicle 10 via the network 20. After block 260 the process 200 ends. Alternatively, after block 260, the process 200 may return to the block 210 (not shown) to continue receiving current location(s), data indicating the user event(s) and determining whether such locations and data satisfy a rule or raise the confidence level above the threshold level.

Conclusion

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising, a computer programmed to:
   receive information indicating a current location from a first user device that is separate from the computer;
   receive data about a user event from a second device that is separate from the computer and the first user device, the second user device including a point of sale system, wherein the data about the user event indicates a transaction completed by the point of sale system and a location of the transaction that corresponds to the current location;
   determine, based on the received information indicating the current location and the received data about the user event indicating the transaction completed by the point of sale system, whether to trigger actuation of a pickup; and
   in response to determining to trigger actuation of the pickup based on the received information indicating the current location and the received data about the user event indicating the transaction completed by the point of sale, instruct a vehicle to navigate to a pickup location.

2. The system of claim 1, wherein the current location is based on information received by the first device from a beacon that includes a low energy Bluetooth device.

3. The system of claim 1, wherein the current location indicates a location within a threshold distance of a building exit after the data about the user event indicating the transaction has been received and the current location within the threshold distance of the building exit is used to determine whether to trigger actuation of the pickup.

4. The system of claim 1, wherein the data about the user event received from the second device includes a user communication in the form of a text message.

5. The system of claim 1, wherein the computer is further programmed to determine whether to trigger actuation of the pickup based on data indicating a user gait characteristic that includes a balance of the gait between a swing phase and a support phase.

6. The system of claim 1, wherein the data about the user event received from the second device includes a message from a smart appliance.

7. The system of claim 6, wherein the computer is further programmed to identify that a pickup at the pickup location has been performed after a previous actuation of the smart appliance.

8. The system of claim 1, wherein the data about the user event received from the second device includes one or more of data indicating a transaction, a user communication, audio data, accelerometer data, a message from a smart appliance, and user habit data.

9. A method comprising:
   receiving information indicating a current location from the first user device;
   receiving data about a user event from a second device that is separate from the first user device, the second user device including a point of sale system, wherein the data about the user event indicates a transaction completed by the point of sale system and a location of the transaction that corresponds to the current location;
   determining, based on the received information indicating the current location and the received data about the user event indicating the transaction completed by the point of sale system, whether to trigger actuation of a pickup; and
   in response to determining to trigger actuation of the pickup based on the received information indicating the current location and the received data about the user event indicating the transaction completed by the point of sale, actuating a vehicle to navigate to a pickup location.

10. The method of claim 9, wherein the current location data is based on information received by the first device from a beacon that includes a low energy Bluetooth device.

11. The method of claim 9, wherein the current location data indicates a location within a threshold distance of a building exit after the data indicating the transaction has been received and is used to determine whether to trigger actuation of the pickup.

12. The method of claim 9, wherein the data about the user event received from the second device includes a user communication in the form of a text message.

13. The method of claim 9, further comprising determining whether to trigger actuation of a pickup based on data indicating a user gait characteristic that includes a balance of the gait between a swing phase and a support phase.

14. The method of claim 9, wherein the data about the user event received from the second device includes a message from a smart appliance.

15. The method of claim 14, further comprising identifying that a pickup at the pickup location has been performed after a previous actuation of the smart appliance.

16. The method of claim 9, wherein the data about the user event received from the second device includes one or more of data indicating a transaction, a user communication, audio data, accelerometer data, a message from a smart appliance, and user habit data.

17. A system, comprising a computer programmed to:
   receive information indicating a current location from a first user device that is separate from the computer;
   receive data about a user event from a second device that is separate from the computer and the first user device, the second user device including a point of sale system, wherein the data about the user event indicates a transaction completed by the point of sale system and includes one or more of data indicating a transaction, a user communication, audio data, accelerometer data, a message from a smart appliance, and user habit data;
   determine, based on the received information indicating the current location and the received data about the user event indicating the transaction completed by the point of sale system, whether to trigger actuation of a pickup; and
   in response to determining to trigger actuation of the pickup based on the received information indicating the current location and the received data about the user event indicating the transaction completed by the point of sale, instruct a vehicle to navigate to a pickup location.

18. The system of claim 17, wherein the current location is based on information received by the first device from a beacon that includes a low energy Bluetooth device.

19. The system of claim 17, wherein the current location indicates a location within a threshold distance of a building exit after the data about the user event indicating the transaction has been received and the current location within the threshold distance of the building exit is used to determine whether to trigger actuation of the pickup.

20. The system of claim 17, wherein the data about the user event received from the second device includes a user communication in the form of a text message.

* * * * *